United States Patent [19]

Rupprecht et al.

[11] Patent Number: 5,064,034

[45] Date of Patent: Nov. 12, 1991

[54] SPREADING-WEDGE DEVICE, PARTICULARLY FOR MOTOR-VEHICLE BRAKES

[75] Inventors: Bernd Rupprecht, Edingen-Neckarhausen; Reinhard Baumgärtner, Mannheim, both of Fed. Rep. of Germany

[73] Assignee: Deutsche Perrot-Bremse GmbH, Mannheim, Fed. Rep. of Germany

[21] Appl. No.: 535,497

[22] Filed: Jun. 11, 1990

[30] Foreign Application Priority Data

Jun. 20, 1989 [DE] Fed. Rep. of Germany ....... 3920161

[51] Int. Cl.⁵ ............................................ F16D 51/00
[52] U.S. Cl. .................................................. 188/343
[58] Field of Search ................... 188/343, 342, 196 V, 188/72.7, 298; 192/93 R, 85 AB, 78, 70.23, 70; 92/98 D

[56] References Cited

U.S. PATENT DOCUMENTS

| 3,789,675 | 2/1974 | Kocher | 92/98 D |
|---|---|---|---|
| 3,969,991 | 7/1976 | Comstock et al. | 92/98 D |
| 4,519,482 | 5/1985 | Ott et al. | 188/343 |
| 4,711,158 | 12/1987 | Kayyod et al. | 92/98 D |
| 4,741,252 | 5/1988 | Harter et al. | 92/98 D |

FOREIGN PATENT DOCUMENTS

| 0087335 | 12/1986 | European Pat. Off. |
| 0106954 | 11/1987 | European Pat. Off. |
| 0261903 | 3/1988 | European Pat. Off. |

*Primary Examiner*—Robert J. Oberleitner
*Assistant Examiner*—Christopher Schwartz
*Attorney, Agent, or Firm*—Fleit, Jacobson, Cohn, Price, Holman & Stern

[57] ABSTRACT

A spreading wedge actuator for vehicle brakes includes a housing (11) mounted on a brake carrier, two coaxial pressure members (2, 3) displaceably mounted in the housing (1) and abutting at outer ends against the brake operating members, a spreading wedge (8), between and abutting via rollers (4, 5) against inner ends of the two pressure members (2, 3) and extending outward through an opening (6) in a housing neck (7), a spreading-wedge shaft (9) operated by a diaphragm cylinder or similar device for reciprocating the spreading-wedge to operate the pressure members (2, 3) and thus the brakes, and a sealing device between the spreading-wedge shaft (9) and the housing neck (7) with a frustoconically shaped flexible sealing member (10) extending via a diversion area (15) between two ring shaped rims (11, 12) at its ends having different diameters. The smaller diameter edge rim (11) engages the spreading-wedge shaft (9) and the larger diameter edge rim (12) is fixed to the housing in the area of the housing neck (7) by a spring plate (13). A return spring (21) surrounds the spreading-wedge and shaft unit. The development of cracks in the seal is avoided and the lifespan is extended in that the flexible sealing cover in the shape of a frustoconical roller bellows (10) is arranged with the smaller diameter rim (11) sealingly embracing the spreading-wedge shaft (9), and with spring plate (13) joined to the larger diameter rim (12) and serving as the support for the return spring (21).

9 Claims, 2 Drawing Sheets

SPREADING-WEDGE DEVICE, PARTICULARLY FOR MOTOR-VEHICLE BRAKES

BACKGROUND OF THE INVENTION

The invention relates to a spreading-wedge device, particularly for motor-vehicle brakes, and more specifically to such a device which includes a housing attached to the brake carrier, two. coaxial pressure means which are displaceably mounted in the housing and abut against a brake-operating member, a spreading wedge which engages against a plurality of rollers which in turn engage against the two pressure means, the wedge extending to the outside through an opening in the housing neck, including a spreading-wedge shaft, a diaphragm cylinder or similar item, serving the loading of both the pressure means and thus the brake, which axially abuts against the spreading-wedge shaft, and a sealing unit, arranged between the spreading-wedge shaft and the housing neck, with a flexible sealing cover which extends, via a diversion area between two ring-shaped edge rims of different diameters, from where the edge rim with smaller diameter abuts against the spreading-wedge shaft and the edge rim with larger diameter is fixed within the area of the housing neck, and with a return spring embracing the spreading-wedge-spreading-wedge shaft unit.

Such spreading-wedge devices with flexible sealing cover are to satisfy the requirement that no dust- and dirt particles or dampness can enter via the diaphragm cylinder into the greasefilled housing interior and mix with the grease which can cause corrosion and increased wear at the functional parts and hence premature failure of the spreading-wedge device.

In an already known spreading-wedge device of the initially described type European Patent Specification, corresponding to U.S. Pat. No. 4,519,482, the smaller edge rim has been placed for this reason at the spreading-wedge edge between a spring bushing and a pressure-spring loaded disc. A further spring, serving as a return spring, is provided in the form of a pulling spring which abuts against the housing in the area of the fixing location of the larger edge rim. The sealing cover embraces an approximately cylindrical section with larger diameter, adjacent to which is a cylindrical section with smaller diameter. It has been found that, with activation of the spreading wedge via the diaphragm cylinder axially into the housing, disadvantageously due to the cylindrical arrangement of the two cover sections, no roll-in movement takes place. Instead, folds develop in the connection area of the two cover sections, leading to the development of cracks. Since such a sealing device is required to withstand several hundreds of thousands of brake-operating lifts, a premature development of cracks causes failure of the spreading-wedge device.

It has been found that fixing the sealing cover via the two springs, which are required for its support or the spreading-wedge return respectively, and thus squeezing on the rims also results in the formation of cracks and hencewith in failure of the sealing cover.

It has been tried to counter these disadvantages European Patent Specifications Nos. 106,954 and 261,903 by constructing the sealing cover to be inflexible so that it cannot follow the axial path of the spreading wedge but instead acts as a sliding device via its inner circumference abutting against the spreading-wedge shaft. However, the following disadvantages were discovered: due to the friction, a loss in the degree of effectiveness occurs. Furthermore, a grinding effect between the spreading-wedge shaft and the inside circumference of the sliding device causes increased wear of those parts. Finally, it has been found that during operation of the brake, foreign particles accumulating at the spreading-wedge shaft press against the seal and can penetrate into the inside of the housing. In addition, in the embodiment according to European Patent Specification No. 106,954 cracks may form in the exterior rim region due to squeezing by the pressure spring, or intrusion inbetween the spring windings if folds develop at the outer circumference of the seal. Since the larger rim is firmly fixed by screwing in the guide tube of the diaphragm cylinder, grease contained in the inside area of the spreading-wedge device can exit while being mounted or being in a state of transport because of loose mounting of the diaphragm cylinder inside the housing neck due to lack of seals. Conversely, dirt and wet particles can enter the inside of the spreading-wedge device.

BRIEF SUMMARY OF THE INVENTION

It is the object of the present invention to further develop the spreading-wedge device of the initially mentioned type by dispensing with the mentioned disadvantages in a simple manner so that the flexible sealing cover associated with the spreading-wedge shaft perfectly seals the inside space of the housing with the spreading-wedge device against entry of foreign particles and is in shape and mounting constructed and placed in such a manner that it executes axial movements of the spreading wedge by rolling in or rolling out respectively without folding up or without the need of parts of the support of the operating members respectively being clamped.

The inventive spreading-wedge device which achieves this object is substantially characterized in that the flexible sealing cover is constructed in the shape of a frustoconical roller bellows with the rim of smaller diameter sealingly embracing the spreading-wedge shaft, and with a spring plate with which it is joined in the area of the rim with larger diameter to form one unit serving the support of the return spring, which plate abuts against the housing neck under the influence of said spring. In this way, excellent roll-in- and roll-out properties of the roller bellows without danger of cracks forming are achieved, which danger is also reduced by fixing the roller-ball rims in a simple manner.

As far as manufacturing and fitting are concerned, it has proved to be most favorable to provide the spreading-wedge shaft with an annular groove to accommodate the roller-bellows rim of smaller diameter. In this way, the disposition between a bushing and a disc under the effect of a pressure spring, as in the conventional embodiment according to European Patent Specification No. 87,335 can be dispensed with. Thus, this embodiment also ensures a long lifespan of the flexible sealing cover responsible for the perfect seal.

In order to guarantee perfect, crease-free roll-in and roll-out over the entire path of the spreading-wedge shaft, combined with perfect guidance and support of the frustoconical roller bellows during any possible loading of the pressure means and thus the brake, it is advantageous if the frustoconical roller bellows is provided between the two rims with a diversion area which, at its operative end, is always near one of the two roller-bellows ends, and if the length of the frustoconical roller bellows between the one of the two rims and the diversion area immediately in front of the other rim is at least equal to one-half the length of the possible maximum reciprocating movement of the spreading wedge.

A particularly compact embodiment can be obtained if the spring-plate edge against which is fixed the roller-bellows rim of larger diameter extends approximately up to the middle between the two end positions of the rim of smaller diameter fixed onto the spreading-wedge shaft at the respective operating-lift ends.

The free edge of the spring plate can be connected to the roller-bellows rim of larger diameter by adhesion or screw connection. As regards the achieved quality, it has proved to be particularly advantageous if the free edge of the spring plate is connected to the roller-bellows rim of larger diameter by vulcanization.

The connection can be produced directly. However, it is production wise particularly advantageous if the roller-bellows rim of larger diameter is connected by vulcanization to a metal ring, if the spring plate includes a sleeve shaped section with slightly conical narrowing and if the metal ring is connected to the free edge of the spring plate by pressing into the slightly frustoconical-shaped sleeve-like section.

A particularly protective and yet safe tight disposition in the area of the housing neck is achieved in a further development in that the spring plate includes a radially extending collar through which the plate supports itself under the influence of a return spring and via a sealing ring against an extension of the housing neck. To fix the spring plate, it has proved to be very advantageous if the spring plate is secured in the housing neck by way of a safety or retaining ring arranged in its collar and engaging a groove in the housing neck. A particular good use of space in the area of the housing neck is achieved in a further development in that the spring plate includes a cross-sectionally U-shaped section which is joined on the one side by the radially extending collar, and on the other side by the sleeve shaped section with slightly frustoconical narrowing.

It is of advantage to fix to the side of the spreading-wedge shaft facing the diaphragm cylinder an exterior spring plate to receive the roller-bellows rim of smaller diameter, onto which abuts the other end of the return spring. For the purpose of fixing the exterior spring plate, it has proved appropriate to provide a circlip, accommodated in an annular groove of the spreading-wedge shaft, which clip axially supports the spring plate.

BRIEF DESCRIPTION OF THE DRAWINGS

Further details, advantages and features, to which particular reference is made in the text, are contained in the following detailed description, with reference to the accompanying drawings wherein.

DETAILED DESCRIPTION

Figure 1:
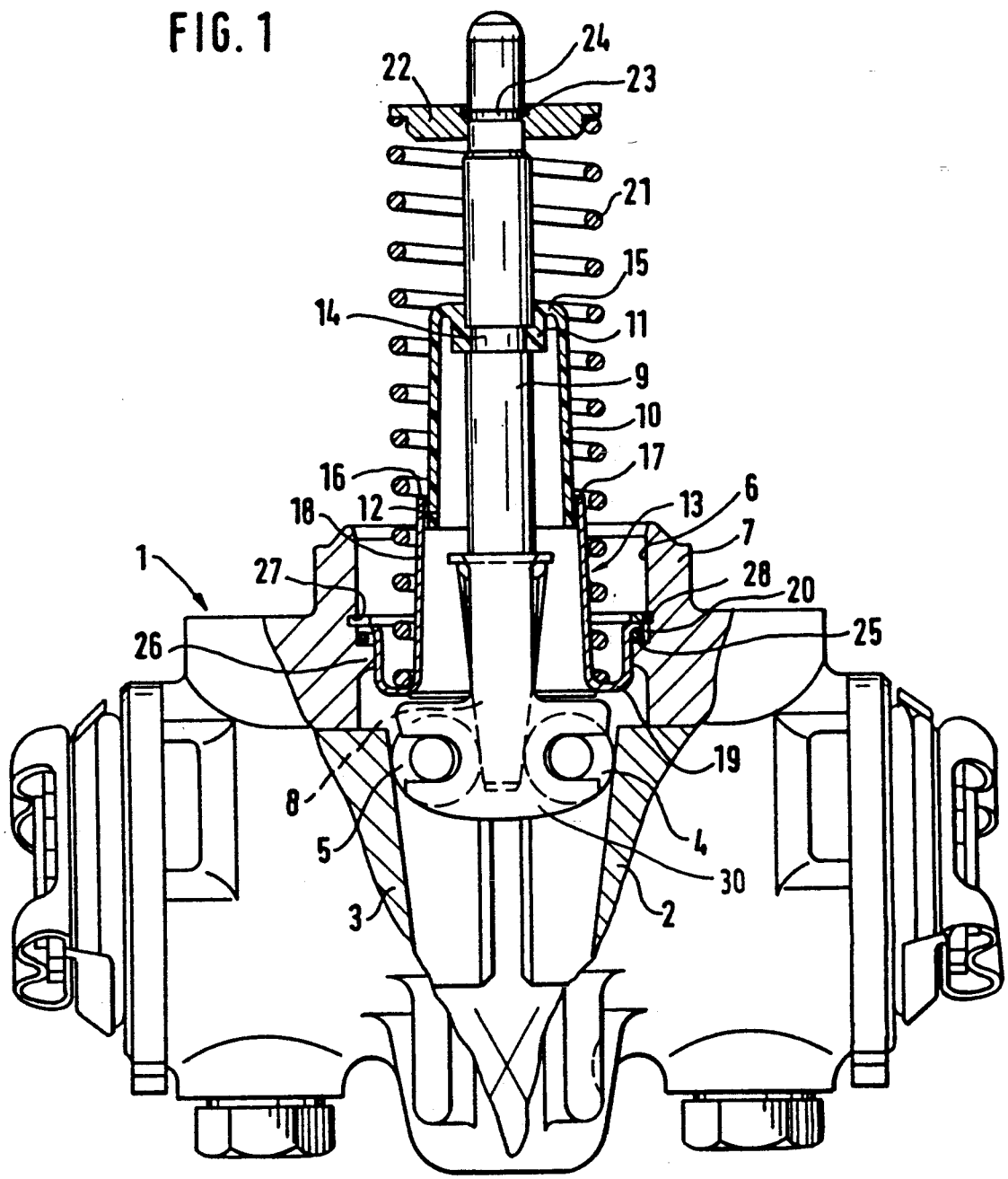
FIG. 1 is a partial cross-sectional, elevational view of the spreading-wedge device of the invention; and, FIG. is an enlarged cross-sectional view of part of FIG. 1 illustrating the two possible end positions of the spreading-wedge lift.

As is shown in the drawing, the illustrated spreading-wedge device includes a housing 1, attached to a brake carrier (not shown), with two coaxial pressure means 2,3 which engage a brake-operating member which is not shown in detail. Onto both pressure means 2,3 abuts in rolling engagement, via rollers 4,5, which are rotatable in a cage 30 and engaged by a spreading wedge 8 having a spreading-wedge shaft 9 which extends outward through an opening 6 in the housing neck 7. The spreading-wedge shaft 9 is associated with an axially applied diaphragm cylinder (not shown) or similar device which serves to load the pressure means and, in consequence thereto, the brake. Furthermore, between the spreading-wedge shaft 9 and the housing neck 7 is inserted a sealing device which includes a seal cover in the shape of a frustoconical roller bellows 10 with a roller-bellows rim 11 of smaller diameter, sealingly holding the spreading-wedge shaft 9, and with a roller-bellows rim 12 of larger diameter. The latter is constructed as one unit with a spring plate 13, sealingly fixed onto the housing neck 7.

As the drawing shows, the roller-bellows rim 11 of smaller diameter sealingly engages an annular groove 14 of the spreading-wedge shaft 9. The conical roller bellows 10 has between the two rims 11, 12 a diversion area 15 which is at the operational-lift end always near one of the two roller-bellows ends. The length of the frustoconical roller bellows 10 between one of the rims 11, 12 and the diversion area 15 immediately ahead of the other rim is chosen to be at least equal to one-half the length of the maximum possible reciprocating movement of the spreading wedge 8. The edge 16 of the spring plate 13, onto which is fixed the roller-bellows rim 12 with larger diameter, extends up to approximately the middle between the two end positions of the rim 11 with smaller diameter which is fixed to the spreading-wedge shaft 9 at the respective operating-lift ends. A metal ring 17 is attached by vulcanization to the roller-bellows rim 12 of larger diameter. As is shown in the illustration, the spring plate 13 includes a sleeve shaped section 18 with slightly conical narrowing which terminates in the edge 16. The metal ring 17 is connected to said free edge 16 by pressing into the slightly conically shaped sleeve-like section 18 of the spring plate 13. In the shown example, the length of the sleeve 18 corresponds with the maximum roll-in path of the roller bellows 10 during maximum operational lift. But, it can also be shorter if so required by the mounting position of the spring plate 13 in the housing 1.

The spring plate 13 includes a cross-sectionally U-shaped section 19 adjacent to which is on the one side a radially outwardly extending collar 20, and on the other side the sleeve shaped section 18 with slightly frustoconical narrowing. In the U-shaped section 19 of the spring plate 13 lies the one end of a spiral-threaded return spring 21, the other end of which abuts against an exterior spring plate 22. This exterior spring plate 22 is attached to the spreading-wedge shaft 9 at the side of the annular groove 14 facing the diaphragm cylinder, which groove is to receive the roller-bellows rim 11 with smaller diameter. For this purpose, a circlip 23 is provided which is fitted in an annular groove 24 an the spreading-wedge shaft 9 and against which abuts the exterior spring plate 22.

The spring plate 13 is itself supported against an extension 26 of the housing neck 7 via the radially extending collar 20 and via a sealing ring 25. The spring plate 13 is secured in the housing neck 7 by means of a retainer ring 28 which engages collar 20 which in turn engages in a groove 27 in the housing neck 7.

Figure 2:
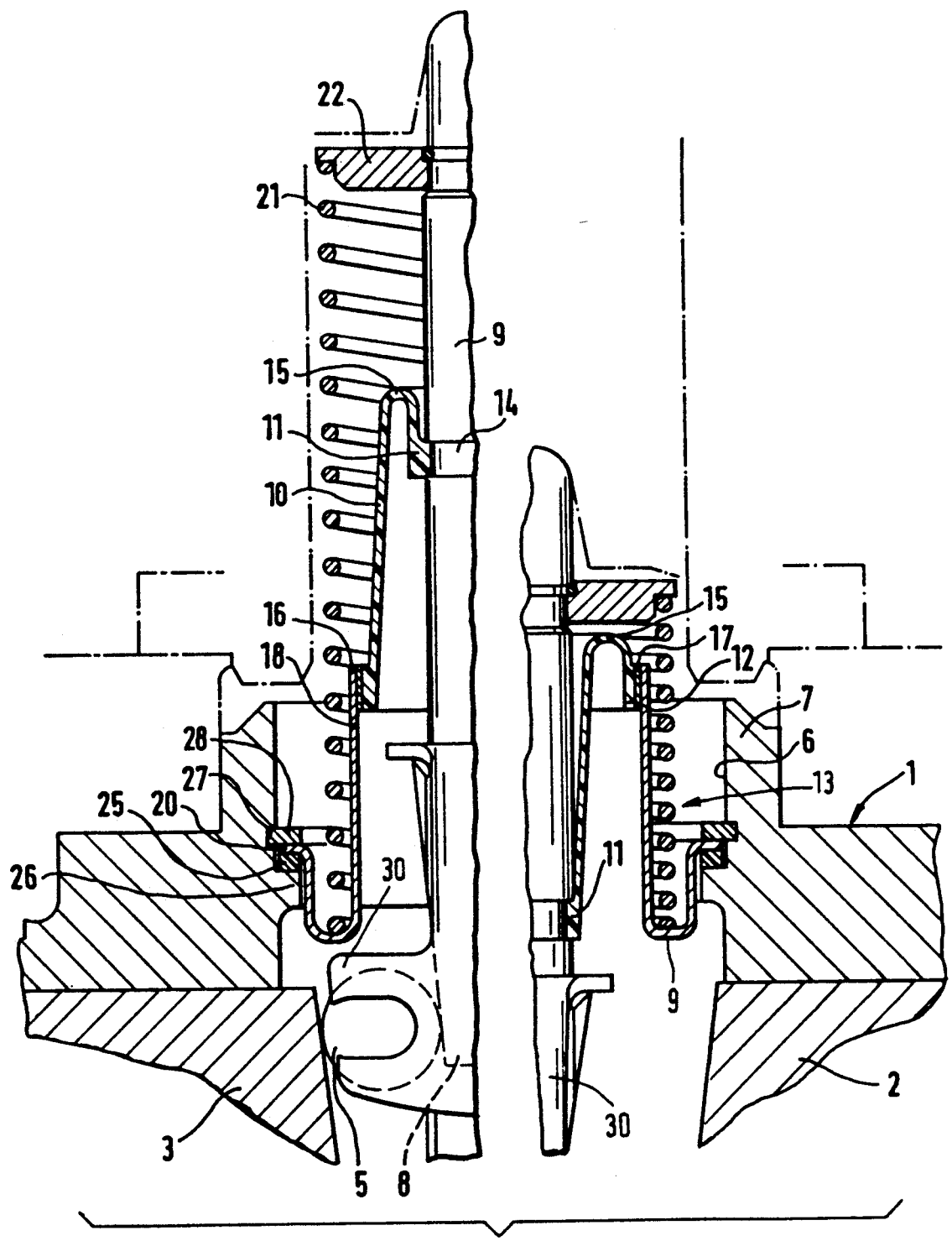

FIG. 2 shows the operational method of the frustoconical roller bellows 10 by way of illustrating the two lift-end positions. In the left half is shown the initial position of the spreading-wedge shaft 9. The diversion area 15 is in the vicinity of the roller-bellows rim 11 of smaller diameter. When operating the brake, i.e. with an axial load on the spreading-wedge shift 9, the rim 11 reaches the lower position shown in the right half of FIG. 2 and the diversion area 15 reaches the vicinity of the rim 12 with larger diameter.

When unloading the brakes, the spreading-wedge shaft 9 including spreading wedge 8 is axially returned into its inoperative position by the pre-tensioned return spring 21. Thereby, the roller bellows 10 follows this movement by rolling and finally takes up its initial position in which diversion area 15 is again in the vicinity of the roller-bellows rim 11 with smaller diameter.

We claim:

1. In a spreading-wedge device for motor-vehicle brakes, including a housing attached to a brake carrier, two coaxial pressure members displaceably mounted in the housing and abutting against brake-operating members, a spreading wedge reciprocally operable between said two pressure members and extending through an opening in the housing, a spreading-wedge shaft extending from the spreading wedge for reciprocating said spreading wedge, cage means reciprocally operable between said pressure members, rollers rotatably carried by the cage means and disposed between and engaging with the spreading wedge and pressure members so that displacement of the shaft inwardly of the housing displaces the cage means inwardly and spreads the pressure members apart thereby operating the brakes, and a sealing unit between the spreading-wedge shaft and the opening in the housing, the improvement comprising:

a flexible sealing cover having a shape substantially in the form of a frustoconical roller bellows;

a smaller diameter ring-shaped rim at one end of said roller bellows sealingly connected to the spreading wedge shaft;

a spring plate engaging the housing in the opening thereof;

a larger diameter ring-shaped rim at the other end of said roller bellows connected to said spring plate;

retracting spring means surrounding part of the spreading wedge when in a retracted position and part of the spreading wedge shaft and disposed between said spring plate and the spreading wedge shaft for resiliently urging the spreading wedge and shaft toward the retracted position when the brakes are not operated;

an annular groove in the spreading-wedge shaft for receiving said smaller diameter roller-bellows rim;

a diversion area on said roller bellows between said rims thereof and positioned near one of said rims when the spreading wedge is at the limits of its reciprocating movement; and said roller bellows having a length between the other of said rims and said diversion area at least equal to one-half the length of the maximum possible reciprocating movement of the spreading wedge.

2. Spreading-wedge device as claimed in claim 1 wherein:

a roller bellows engaging edge is provided on said spring plate and is disposed substantially at the middle of the two end positions of said smaller diameter rim corresponding to the respective limits of the reciprocating movement of the spreading wedge.

3. Spreading-wedge device as claimed in claim 1 wherein:

a roller bellows engaging edge is provided on said spring plate and said larger diameter rim is connected by vulcanization to said edge.

4. Spreading-wedge device as claimed in claim 3, wherein:

a metal ring is connected by vulcanization to said larger diameter rim;

said spring plate comprises a frustoconical sleeve shaped section;

said roller bellows engaging edge is at the smaller diameter end of said sleeve shaped section; and said metal ring is connected to said roller bellows engaging edge by a press fit into said smaller diameter end.

5. Spreading-wedge device as claimed in claim 1 wherein:

said spring plate comprises a radially extending collar;

a radial extension is provided on the housing in the opening of the housing;

a sealing ring is provided on said extension; and said collar is urged against and supported on said sealing ring by the force of said retracting spring means.

6. Spreading-wedge device as claimed in claim 5 and further comprising:

a circlip engageable in a groove in the opening and engageable with said collar for retaining said spring plate on the housing.

7. Spreading-wedge device as claimed in claim 5 wherein said spring plate comprises:

a frustoconical sleeve shaped portion; and a cross-sectional U-shaped portion adjacent on one side thereof to said collar and on the other side thereof to said sleeve shaped portion.

8. Spreading-wedge device as claimed in claim 1 and further comprising:

an exterior end on said spreading wedge shaft remote from the spreading wedge; and an exterior spring plate removeably connected to the spreading wedge shaft between said exterior end and said smaller diameter rim on said roller bellows;

said retracting spring means engaging with said exterior spring plate.

9. Spring-wedge device as claimed in claim 8 and further comprising:

an annular groove on said spreading wedge shaft at the position of said exterior spring plate; and, a circlip engageable in said annular groove and engageable with said exterior spring plate for retaining said exterior spring plate on said shaft against the force of said retracting spring means.

* * * * *